(12) United States Patent
Shimatsu et al.

(10) Patent No.: US 10,197,029 B2
(45) Date of Patent: Feb. 5, 2019

(54) FUEL INJECTION CONTROL APPARATUS

(71) Applicant: KEIHIN CORPORATION, Shinjuku-ku, Tokyo (JP)

(72) Inventors: Takayuki Shimatsu, Shioya-gun (JP); Masamitsu Mori, Shioya-gun (JP); Masateru Moriya, Sakura (JP); Gaku Sato, Utsunomiya (JP); Ikuhiro Uemura, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 116 days.

(21) Appl. No.: 15/131,473

(22) Filed: Apr. 18, 2016

(65) Prior Publication Data
US 2016/0333812 A1 Nov. 17, 2016

(30) Foreign Application Priority Data
May 15, 2015 (JP) .................................. 2015-100119

(51) Int. Cl.
*F02M 51/00* (2006.01)
*F02M 51/06* (2006.01)
(Continued)

(52) U.S. Cl.
CPC ......... *F02M 51/0614* (2013.01); *F02D 41/20* (2013.01); *F02D 41/221* (2013.01); *F02D 35/023* (2013.01); *F02D 41/1402* (2013.01); *F02D 2041/202* (2013.01); *F02D 2200/025* (2013.01); *F02M 51/0685* (2013.01); *F02M 57/005* (2013.01); *F02M 2200/247* (2013.01); *Y02T 10/40* (2013.01)

(58) Field of Classification Search
CPC ........... F02M 51/0614; F02M 51/0685; F02M 57/005; F02M 2200/247; F02M 2200/025; F02D 41/20; F02D 41/221; F02D 2041/202; F02D 35/023; Y02T 10/40
See application file for complete search history.

(56) References Cited

U.S. PATENT DOCUMENTS

| 4,766,405 A | * | 8/1988 | Daly ................. F02M 51/0625 335/257 |
| 5,839,412 A | * | 11/1998 | Stockner ............... F02D 41/20 123/446 |

(Continued)

FOREIGN PATENT DOCUMENTS

| CN | 102650241 A | 8/2012 |
| CN | 103069138 A | 4/2013 |

(Continued)

OTHER PUBLICATIONS

German Office Action corresponding to Application No. 102016108778.5; dated Apr. 27, 2017.
(Continued)

*Primary Examiner* — Hieu T Vo
*Assistant Examiner* — Sherman Manley
(74) *Attorney, Agent, or Firm* — Cantor Colburn LLP

(57) ABSTRACT

A drive current applied to a coil is reduced from a time at which a first collision signal indicating collision of a movable core with a valve element is input to a time at which a second collision signal indicating collision of the movable core with a stationary core is input.

6 Claims, 5 Drawing Sheets

(51) Int. Cl.
*F02D 41/20* (2006.01)
*F02D 41/22* (2006.01)
*F02D 41/14* (2006.01)
*F02D 35/02* (2006.01)
*F02M 57/00* (2006.01)

(56) References Cited

U.S. PATENT DOCUMENTS

| | | | | |
|---|---|---|---|---|
| 6,076,508 | A * | 6/2000 | Nakano | F02D 41/20 123/490 |
| 6,279,523 | B1 * | 8/2001 | Iida | F01L 9/04 123/90.11 |
| 6,453,876 | B1 * | 9/2002 | Fukutomi | F02D 41/20 123/490 |
| 6,657,847 | B1 * | 12/2003 | Wright | F01L 9/04 361/152 |
| 8,960,157 | B2 * | 2/2015 | Kusakabe | F02D 41/20 123/472 |
| 9,086,041 | B2 * | 7/2015 | Jalal | F02M 51/0603 |
| 9,593,657 | B2 * | 3/2017 | Kusakabe | F02D 41/20 |
| 9,822,746 | B2 * | 11/2017 | Shimatsu | F02M 51/0632 |
| 2008/0276907 | A1 * | 11/2008 | Abe | F02D 41/20 123/472 |
| 2012/0318883 | A1 * | 12/2012 | Kusakabe | F02D 41/20 239/1 |
| 2016/0177855 | A1 * | 6/2016 | Kusakabe | F02D 41/20 123/490 |

FOREIGN PATENT DOCUMENTS

| | | |
|---|---|---|
| DE | 10257896 A1 | 7/2004 |
| DE | 102007024398 A1 | 11/2008 |
| JP | 2002030972 A | 1/2002 |
| JP | 2002309991 A | 10/2002 |
| JP | 2012052419 A | 3/2012 |
| JP | 2014152740 A | 8/2014 |
| JP | 2015063928 A | 4/2015 |
| WO | 2013191267 A1 | 12/2013 |

OTHER PUBLICATIONS

JP Notice of Reasons for Rejection corresponding to Application No. 2015-100119; dated Mar. 7, 2017.

JP Notice of Allowance corresponding to Application No. 2015-100119; dated Jan. 9, 2018.

SIPO First Office Action corresponding to Application No. 201610308361.1; dated Aug. 31, 2018.

* cited by examiner

FUEL INJECTION CONTROL APPARATUS

CROSS-REFERENCE TO RELATED APPLICATION

Priority is claimed on Japanese Patent Application No. 2015-100119, filed on May 15, 2015, the contents of which are incorporated herein by reference.

BACKGROUND OF THE INVENTION

Field of the Invention

The present invention relates to a fuel injection control apparatus.

Description of Related Art

A fuel injection control apparatus controlling an amount of injection of fuel from a fuel injection valve is mounted in a vehicle.

This fuel injection control apparatus calculates a required amount of injection of the fuel according to a behavior of the vehicle, and controls the fuel injection valve on the basis thereof.

In the fuel injection valve, when a valve element collides with another member, a collision sound is generated. This collision sound may cause discomfort to passengers of the vehicle. For this reason, in a fuel injection control apparatus disclosed in Japanese Unexamined Patent Application, First Publication No. 2002-30972, immediately before a valve element collides with another member, a drive current of a coil displacing the valve element is reduced to decelerate the valve element, and thereby a collision sound is reduced.

SUMMARY OF THE INVENTION

To reduce the collision sound, the drive current of the coil is preferably reduced at an earlier timing. However, if the timing to reduce the drive current during a valve opening operation is excessively advanced, there is concern that the valve element will affect an amount of injection of fuel without being opened.

Aspects according to the present invention have been made in view of the above problems and are directed to making it possible to further reduce a collision sound of members in a valve opening operation of a fuel injection valve in a fuel injection control apparatus while reliably opening a valve element.

To solve the above problems to achieve the relevant object, the present invention employs the following aspects.

(1) A fuel injection control apparatus according to an aspect of the present invention is which controls a fuel injection valve that causes a movable core driven by an electromagnetic driving portion to collide with a valve element in a housing to thereby displace the valve element in a valve opening direction and causes the movable core to collide with a stationary core to thereby stop displacement of the movable core, and configured such that a drive current applied to the electromagnetic driving portion is reduced from a time at which a first collision signal indicating the collision of the movable core with the valve element is input to a time at which a second collision signal indicating the collision of the movable core with the stationary core is input.

(2) In the aspect of (1), a reduction start timing of the drive current may be adjusted on the basis of a strength of the input second collision signal.

(3) In the aspect of (2), the reduction start timing may be advanced within a range within which the second collision signal does not disappear.

(4) In the aspect of (2) or (3), the reduction start timing may be delayed when the second collision signal is not detected.

(5) In the aspect of (4), when the second collision signal is not detected even if the reduction start timing is delayed, the drive current may be increased more than the drive current before the first collision signal is input.

(6) In any one of the aspects of (1) to (5), the drive current applied to the electromagnetic driving portion from the time at which the first collision signal is input to the time at which the second collision signal is input may be reduced more than a valve opening maintaining drive current applied to the electromagnetic driving portion to maintain an open valve state.

(7) In any one of the aspects of (1) to (6), the first collision signal and the second collision signal may be input from an in-cylinder pressure sensor disposed in a cylinder.

According to the aspects of the present invention, a valve opening period is accurately recognized by the first collision signal, and the drive current supplied to the coil before the movable core collides with the stationary core is reduced. For this reason, the movable core is decelerated by the reduction of the drive current, and a collision sound of the movable core with the stationary core is reduced. According to the aspects of the present invention, the collision sound of the members can be further reduced in a valve opening operation of the fuel injection valve while the valve element is reliably opened.

DETAILED DESCRIPTION OF THE INVENTION

Figure 1:
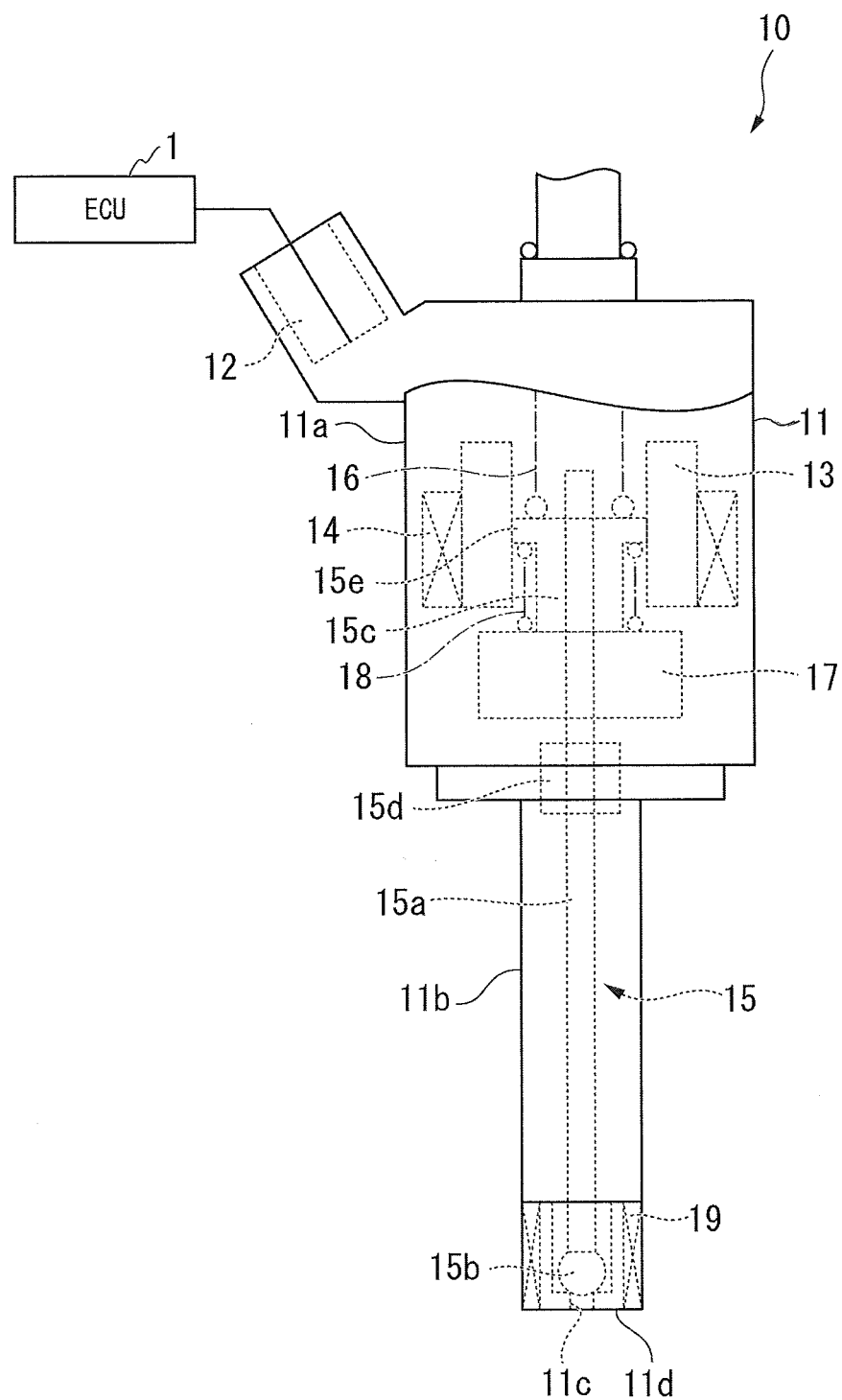
FIG. 1 is a schematic view illustrating a fuel injection valve and an engine control unit (ECU) in an embodiment of the present invention.
Figure 2:
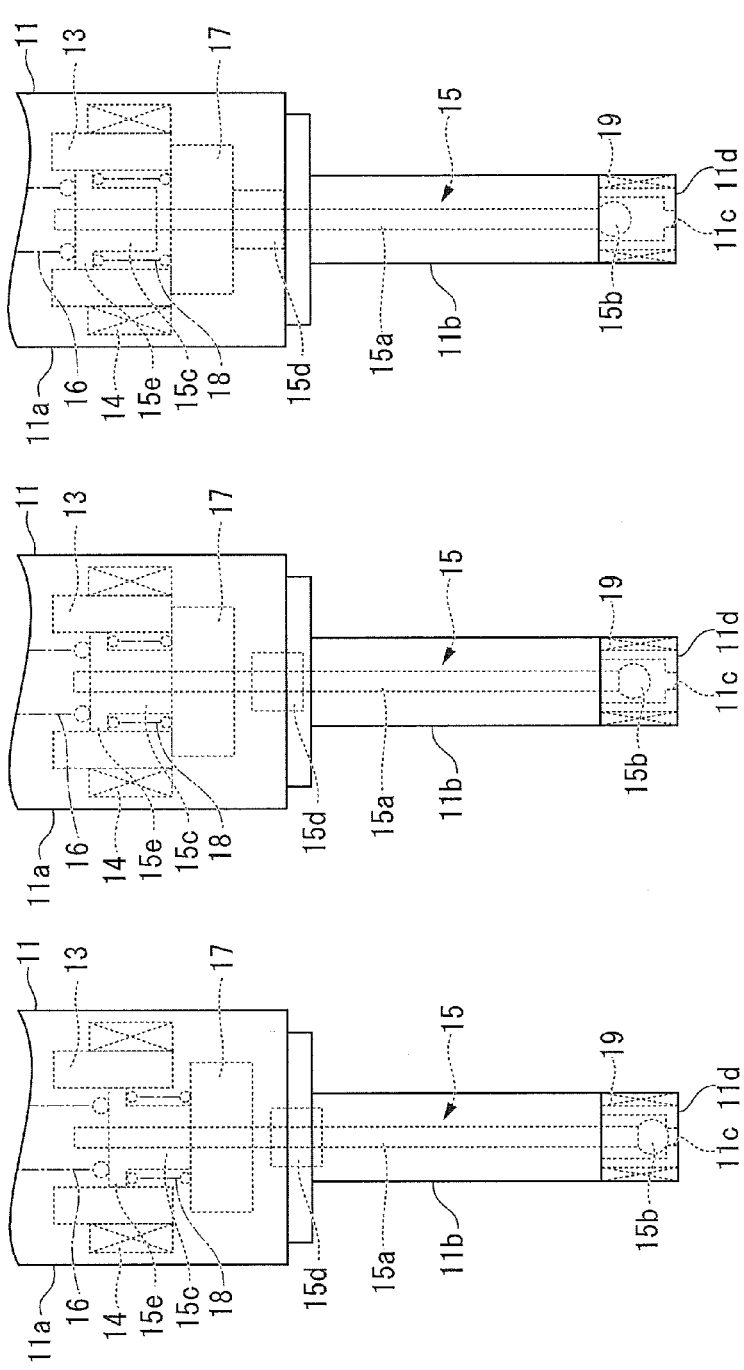
FIGS. 2A-2C are schematic views for describing a valve opening operation of the fuel injection valve.
Figure 3:
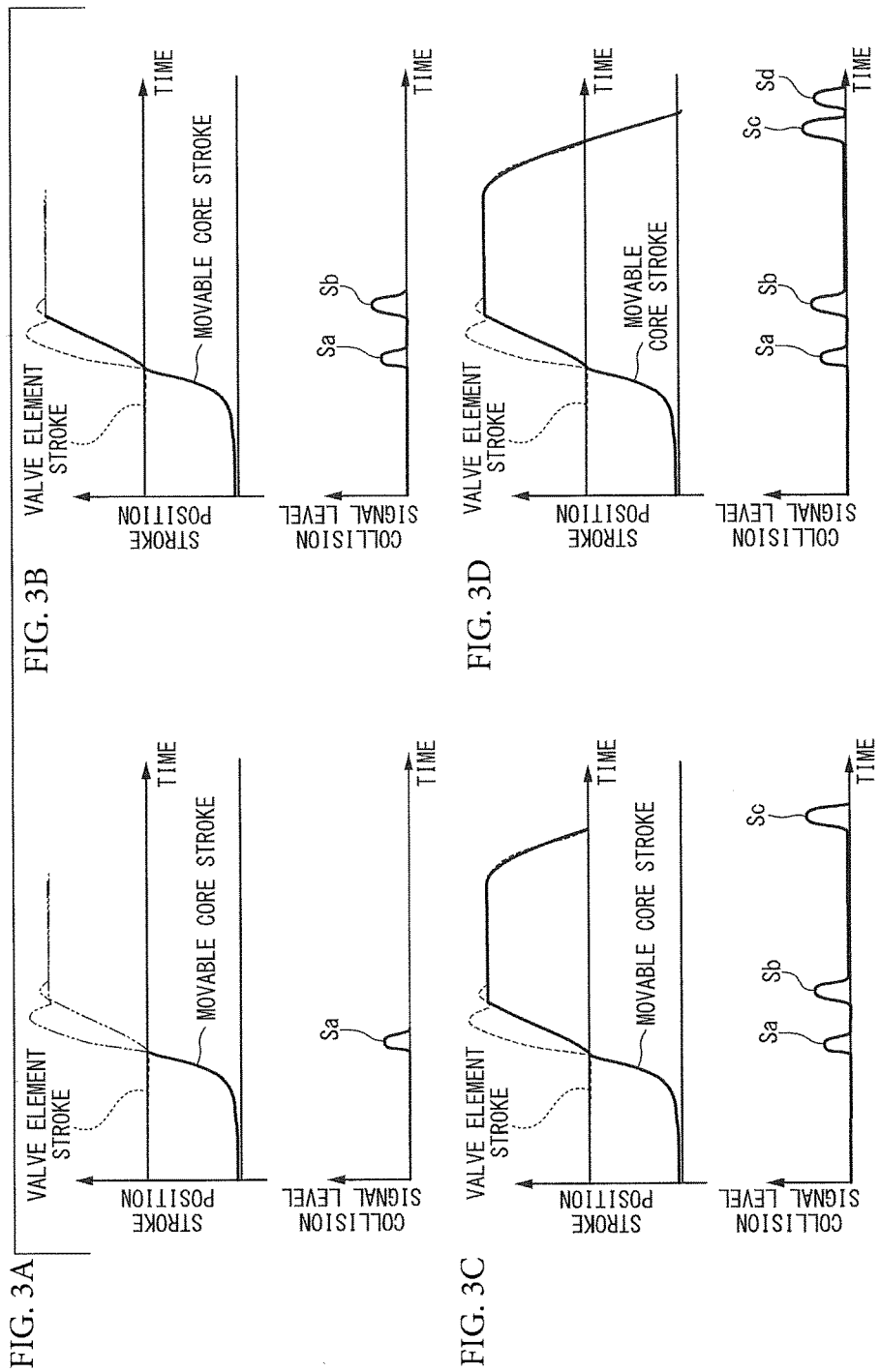
FIGS. 3A-3D are graphs illustrating a relationship between operations of a valve element and a movable core of the fuel injection valve and detected signals from an in-cylinder pressure sensor.

Hereinafter, an embodiment of a fuel injection control apparatus according to the present invention will be described with reference to the drawings. In the drawings below, the scale of each member is appropriately changed such that each member has a recognizable size. Also, the fuel injection control apparatus of the present embodiment is assembled in an engine control unit (ECU) 1 mounted in a vehicle.

First, a fuel injection valve 10 controlled by the ECU 1 of the present embodiment will be described with reference to FIGS. 1 to 4. FIG. 1 is a schematic view illustrating the fuel injection valve 10 and the ECU 1. As illustrated in this figure, the fuel injection valve 10 is equipped with a housing (case) 11, a connecting coupler 12, a stationary core 13, a coil (electromagnetic driving portion) 14, a valve element 15, a valve element biasing spring 16, a movable core 17, a movable core biasing spring 18, and an in-cylinder pressure sensor 19.

The housing 11 is a case in which the stationary core 13, the coil 14, the valve element 15, the valve element biasing spring 16, the movable core 17, and the movable core biasing spring 18 are housed. This housing 11 has a large diameter portion 11a in which the stationary core 13, the coil 14, etc. are housed, and a small diameter portion 11b that is concentrically connected to the large diameter portion 11a. Also, a tip portion of the small diameter portion 11b serves as a valve seat 11d in which an injection hole 11c injecting fuel is formed. This housing 11 is configured to allow the fuel to be supplied from an upper portion of FIG. 1 to an interior thereof. The connecting coupler 12 is connected to an end of the housing 11 which is located at the large diameter portion 11a, and obliquely protrudes from the housing 11 in a lateral direction. This connecting coupler 12 is a portion that electrically connects the fuel injection valve 10 and the ECU 1 of the present embodiment.

The stationary core 13 is a cylindrical member that is concentrically housed in the large diameter portion 11a of the housing 11 and is fixed to the housing 11 by a fixture (not illustrated). This stationary core 13 is formed of a magnetic material. An end face of the stationary core 13 which is directed to the valve seat 11d serves as a contact face with the movable core 17. The coil 14 is formed of a conducting wire that is wound in an annular shape and is disposed concentrically with the stationary core 13 to surround the stationary core 13 from the outside. This coil 14 is electrically connected with a power-supplying unit (not illustrated) controlled by the ECU 1 through the connecting coupler 12, and generates a magnetic field as an electric current is supplied from the power-supplying unit.

The valve element 15 is equipped with a valve needle 15a, a valve portion 15b, a guide member 15c, and a stopper 15d. The valve needle 15a is a long rod member that extends along a central axis of the stationary core 13. As illustrated in FIG. 1, this valve needle 15a is disposed such that a part thereof directed to the stationary core 13 is located in the stationary core 13 and a part thereof directed to the valve seat 11d protrudes from the stationary core 13 toward the valve seat 11d. The valve portion 15b is a spherical region that is fixed to a tip of the valve needle 15a which is directed to the valve seat 11d. This valve portion 15b comes into contact with the valve seat 11d, thereby closing the injection hole 11c and is separated from the valve seat 11d, thereby opening the injection hole 11c.

The guide member 15c is a cylindrical member that is fixed adjacent to an end of the valve needle 15a which is directed to the opposite side of the valve portion 15b. This guide member 15c is configured such that an end face thereof directed to the valve portion 15b serves as a contact face with the movable core 17 and an end face thereof directed to the opposite side of the valve portion 15b serves as a contact face with the valve element biasing spring 16. Also, a flange 15e that protrudes in a radial direction of the valve needle 15a is formed at an end of the guide member 15c which is directed to the opposite side of the valve portion 15b. This flange 15e is configured such that a circumferential surface thereof serves as a sliding surface relative to an inner circumferential surface of the stationary core 13 and a surface thereof directed to the valve portion 15b serves as a contact surface with the movable core biasing spring 18. When the valve portion 15b is in contact with the valve seat 11d, this guide member 15c is fixed to the valve needle 15a such that the end face thereof (the contact face with the movable core 17) directed to the valve portion 15b is located closer to the valve seat 11d than the end face of the stationary core 13 which is directed to the valve seat 11d.

The stopper 15d is a cylindrical member that is fixed to the valve needle 15a between the valve portion 15b and the guide member 15c. This stopper 15d is configured such that an end face thereof directed to the guide member 15c serves as a contact face with the movable core 17 and is disposed such that this contact face is separated from the end face of the guide member 15c which is directed to the valve portion 15b to be greater than a thickness of the movable core 17.

The valve element biasing spring 16 is a compression coil spring that is housed in the stationary core 13 and is inserted between an inner wall surface of the housing 11 and the guide member 15c of the valve element 15. This valve element biasing spring 16 biases the valve element 15 toward the valve seat 11d. That is, the valve element 15 is configured such that, when no power is supplied to the coil 14, the valve portion 15b is brought into contact with the valve seat 11d by a biasing force of the valve element biasing spring 16.

The movable core 17 is disposed between the guide member 15c and the stopper 15d of the valve element 15 at the side of the valve seat 11d relative to the stationary core 13. This movable core 17 is a cylindrical member having a through-hole formed at the center thereof into which the valve needle 15a is inserted, and is configured such that an inner wall surface of the through-hole can slide relative to the valve needle 15a. That is, the movable core 17 is provided independently of the valve element 15 and is configured to be able to be displaced relative to the valve element 15 in a direction in which the valve needle 15a extends. Also, an end face of the movable core 17 which is directed to the guide member 15c serves as a contact face with the stationary core 13 and the movable core biasing spring 18. In addition, an end face of the movable core 17 which is directed to the stopper 15d serves as a contact face with the stopper 15d. This movable core 17 is formed of a magnetic material. If an electric current is conducted to the coil 14 and the coil 14 is excited, a flux path including the stationary core 13 and the movable core 17 is formed, and the movable core 17 is displaced toward the stationary core 13 by an attractive force generated by the formation of the flux path.

The movable core biasing spring 18 is a compression coil spring that surrounds the valve needle 15a, and is inserted between the flange 15e of the guide member 15c with which the valve element 15 is provided and the movable core 17. This movable core biasing spring 18 biases the movable core 17 toward the stopper 15d. That is, when no power is supplied to the coil 14, the movable core 17 is brought into contact with the stopper 15d by a biasing force of the movable core biasing spring 18.

The in-cylinder pressure sensor 19 is fixed to a circumferential surface of the tip portion of the small diameter portion 1b of the housing 11. This in-cylinder pressure sensor 19 is a sensor that detects and outputs a pressure in a cylinder in which the fuel injection valve 10 is installed. Further, since the in-cylinder pressure sensor 19 is fixed to the housing 11, a shock generated by the fuel injection valve 10 is transmitted, and the in-cylinder pressure sensor 19 outputs detected signals including this shock. In the present embodiment, the in-cylinder pressure sensor 19 outputs the detected signals including a signal (hereinafter referred to as "first collision signal") that indicates a shock when the movable core 17 collides with the guide member 15c of the valve element 15, a signal (hereinafter referred to as "second collision signal") that indicates a shock when the movable core 17 collides with the stationary core 13, a signal (hereinafter referred to as "third collision signal") that indicates a shock when the valve portion 15b of the valve element 15 collides with the valve seat 11d, and a signal (hereinafter referred to as "fourth collision signal") that indicates a shock when the movable core 17 collides with the stopper 15d of the valve element 15. In this way, the in-cylinder pressure sensor 19 detects not only the pressure in the cylinder but also operating states of the fuel injection valve 10 (colliding states of the movable core 17, etc.).

Next, an operation of the fuel injection valve 10 configured in this way will be described. Here, the description will be made from a state in which no current is supplied to the coil 14.

FIG. 1 used for describing the constitution of the above fuel injection valve 10 is a view illustrating the state in which no current is supplied to the coil 14. As illustrated in this figure, in the state in which no current is supplied to the coil 14, the valve portion 15b of the valve element 15 is brought into contact with the valve seat 11d by the biasing force of the valve element biasing spring 16. In this way, as the valve portion 15b is brought into contact with the valve seat 11d, the injection hole 11c is closed. Also, in the state in which no current is supplied to the coil 14, the movable core 17 is brought into contact with the stopper 15d of the valve element 15 by the biasing force of the movable core biasing spring 18.

FIGS. 2A to 2C are schematic views for describing a valve opening operation of the fuel injection valve 10. If an electric current is supplied to the coil 14 from the power-supplying unit (not illustrated) under the control of the ECU 1, the coil 14 is excited. Thereby, the flux path including the stationary core 13 and the movable core 17 is formed, and the movable core 17 is displaced toward the stationary core 13 by the attractive force generated thereby. As a result, as illustrated in FIG. 2A, the movable core biasing spring 18 is contracted, and the movable core 17 collides with the guide member 15c of the valve element 15 while the movable core 17 is being separated from the stopper 15d.

Further, if the movable core 17 is displaced toward the stationary core 13, the valve element 15 is raised and displaced in a direction in which the valve element 15 is separated from the valve seat 11d. As a result, the valve portion 15b of the valve element 15 is separated from the valve seat 11d, and the injection hole 11c is opened so that injection of fuel is initiated. In this way, the movable core 17 displaced by a magnetic force is stopped, as illustrated in FIG. 2B, by colliding with the stationary core 13. At this time, the valve element 15 continues to be displaced by an inertial force. As a result, as illustrated in FIG. 2C, the guide member 15c is temporarily lifted from the movable core 17, and then returns to a position at which the guide member 15c comes into contact with the movable core 17 due to the biasing force of the valve element biasing spring 16. The valve opening operation of the fuel injection valve 10 is finished in the order described above.

Also, while the opening of the valve is maintained (i.e., while an instruction to open the valve is input from the ECU 1), a fixed amount of current is applied to the coil 14, and a state in which the valve portion 15b of the valve element 15 is separated from the valve seat 11d is maintained.

When the fuel injection valve 10 opened in this way is closed, the supply of the electric current to the coil 14 is stopped. In this way, if the supply of the electric current to the coil 14 is stopped, the magnetic force generated between the stationary core 13 and the movable core 17 disappears, and the valve element 15 is displaced toward the valve seat 11d by the biasing force of the valve element biasing spring 16. As a result, the valve portion 15b of the valve element 15 comes into contact with the valve seat 11d so that the injection hole 11c is closed. Afterwards, the movable core 17 is displaced toward the stopper 15d of the valve element 15 by the biasing force of the movable core biasing spring 18 and comes into contact with the stopper 15d, and thereby the movable core 17 is stopped.

Also, in addition to the signal indicating the pressure in the cylinder, the detected signals in which the first collision signal, the second collision signal, the third collision signal, and the fourth collision signal are included are output from the in-cylinder pressure sensor 19 with which the fuel injection valve 10 is equipped. FIGS. 3A to 3D are graphs illustrating a relationship between the operations of the valve element 15 and the movable core 17 of the fuel injection valve 10 and the detected signals from the in-cylinder pressure sensor 19. In each of FIGS. 3A to 3D, an upper side is a graph illustrating a relationship between a time and stroke positions of the valve element 15 and the movable core 17, and a lower side is a graph illustrating a relationship between a time and levels of the collision signals included in the detected signals output from the in-cylinder pressure sensor 19. In the graph illustrated at the upper side in each of FIGS. 3A to 3D, a position at which the movable core 17 and the guide member 15c of the valve element 15 collide with each other during the valve opening operation is set as a position at which the stroke position is zero.

As illustrated in FIG. 3A, if the electric current is supplied to the coil 14, only the movable core 17 is displaced, and a first collision signal Sa is output from the in-cylinder pressure sensor 19 at a timing at which the movable core 17 and the guide member 15c of the valve element 15 collide with each other. The movable core 17 is further displaced, and as illustrated in FIG. 3B, a second collision signal Sb is output from the in-cylinder pressure sensor 19 at a timing at which the movable core 17 collides with the stationary core 13.

When the valve is closed, the valve element 15 and the movable core 17 are displaced in a direction of the valve seat 11d, and as illustrated in FIG. 3C, a third collision signal Sc is output from the in-cylinder pressure sensor 19 at a timing at which the valve portion 15b collides with the valve seat 11d. Further, only the movable core 17 is displaced in the direction of the valve seat 11d, and as illustrated in FIG. 3D, a fourth collision signal Sd is output from the in-cylinder pressure sensor 19 at a timing at which the movable core 17 collides with the stopper 15d of the valve element 15.

Figure 4:
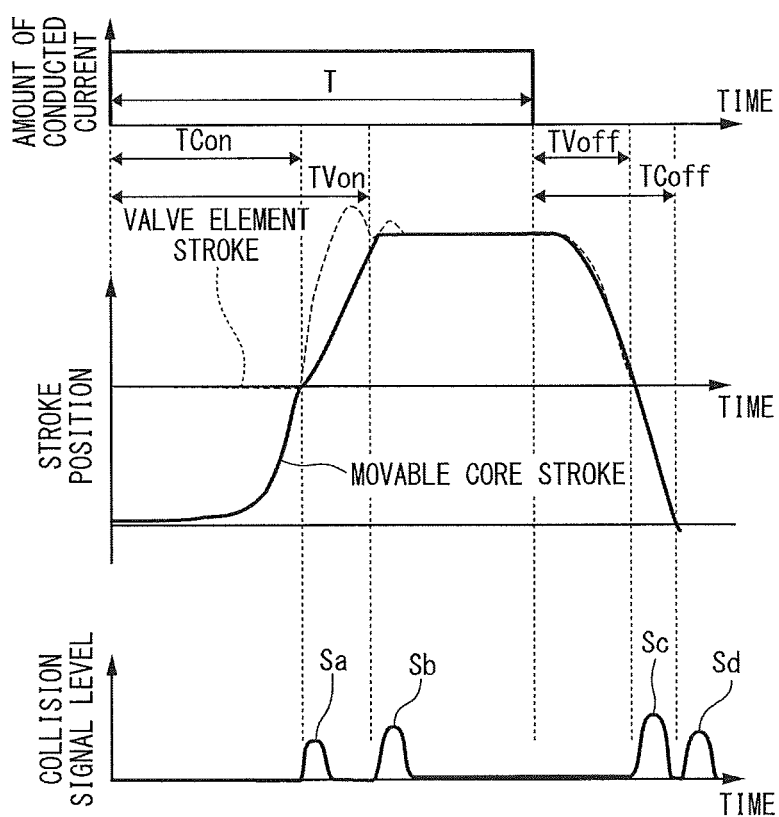
FIG. 4 is a graph illustrating a relationship between a current-conducting period for which an electric current is conducted to a coil of the fuel injection valve, the operations of the valve element and the movable core of the fuel injection valve, and the detected signals from the in-cylinder pressure sensor.

Further, a period for which the fuel injection valve 10 is opened will be described with reference to FIG. 4. FIG. 4 is a graph illustrating a relationship between a current-conducting period for which an electric current is conducted to the coil 14, the operations of the valve element 15 and the movable core 17 of the fuel injection valve 10, and the detected signals from the in-cylinder pressure sensor 19. As illustrated in this figure, T is set as a current-conducting period for which the electric current is conducted to the coil 14, TCon is set as a period (hereinafter referred to as "valve opening delay period TCon") from a time at which the electric current starts to be conducted to the coil 14 to a time at which the first collision signal Sa is output, TVon is set as a period (hereinafter referred to as "full opening arrival period TVon") from the time at which the electric current starts to be conducted to the coil 14 to a time at which the second collision signal Sb is output, TVoff is set as a period (hereinafter referred to as "valve closing delay period TVoff") from a time at which the electric current stops being conducted to the coil 14 to a time at which the third collision signal Sc is output, and TCoff is set as a period (hereinafter referred to as "operation stop period TCoff") from the time at which the electric current stops being conducted to the coil 14 to a time at which the fourth collision signal Sd is output.

An actual valve opening period for which fuel is actually injected from the injection hole 11*c* is between an instant in which the valve portion 15*b* of the valve element 15 is separated from the valve seat 11*d* (i.e., a timing at which the first collision signal Sa is output) and an instant in which the valve portion 15*b* collides with the valve seat 11*d* (i.e., a timing at which the third collision signal Sc is output). Therefore, if the current-conducting period is defined as T, and the actual valve opening period is defined as Tr, the actual valve opening period Tr is expressed by Formula (1) below.

$$Tr=T-TCon+TVoff \quad (1)$$

The ECU 1 of the present embodiment controls the fuel injection valve 10 that causes the movable core 17 driven by the coil (electromagnetic driving portion) 14 as described above to collide with the valve element 15 in the housing 11 to thereby displace the valve element 15 in a valve opening direction, and brings the movable core 17 into contact with the stationary core 13 to thereby stop the displacement of the movable core 17. Here, the ECU 1 of the present embodiment reduces a drive current supplied to the coil 14 from the time at which the first collision signal Sa indicating that the movable core 17 collides with the valve element 15 is input to the time at which the second collision signal Sb indicating that the movable core 17 collides with the stationary core 13 is input.

To be more specific, the ECU 1 of the present embodiment stores a period for which a sufficient flow rate of fuel can be injected from the injection hole 11*c* after the movable core 17 collides with the valve element 15 as a current irreducible period. This current irreducible period is previously obtained by experiment or a learning operation performed after the ECU is mounted in a vehicle, and is set to, for example, about 80% of the period from the time at which the movable core 17 collides with the valve element 15 to the time at which the movable core 17 collides with the stationary core 13. Further, for example, a shortest supply period of the drive current which meets a condition that, even if the supply of the drive current to the coil 14 is reduced or stopped, the valve element 15 reaches a full opening position by inertia may be set as the current irreducible period. The ECU 1 of the present embodiment reduces the drive current supplied to the coil 14 at a timing at which the current irreducible period has elapsed after the first collision signal Sa is input, and thereby reduces the drive current before the second collision signal Sb is input.

Also, the drive current which the ECU 1 of the present embodiment reduces after the elapse of the current irreducible period has an arbitrary value, but may be set as, for example, a hold current (valve opening maintaining drive current) that is supplied to the coil 14 to maintain an open valve state (a full open state) of the valve element 15. This hold current is designed to have a lower value than the value of the drive current supplied to the coil 14 during the valve opening operation because it is unnecessary to generate power that displaces the valve element 15. Without being limited thereto, for example, the drive current after the elapse of the current irreducible period may also be lower (e.g. zero) than the hold current. In this case, the deceleration of the valve element 15 can be expedited.

Further, the ECU 1 of the present embodiment compares an intensity of the second collision signal Sb with a previously stored constant threshold value (a constant value), and adjusts a reduction start timing of the drive current on the basis of this result (i.e., a strength of the second collision signal). For example, when the drive current is reduced just after the elapse of the current irreducible period, it is thought that the movable core 17 is stopped prior to colliding with the stationary core 13. This case cannot be distinguished from the case in which the movable core 17 is not displaced because something is broken. For this reason, when the second collision signal Sb is not detected, the ECU 1 delays the reduction start timing. When the second collision signal Sb is repeatedly undetected, the ECU 1 determines that there is a possibility that something is broken, and gives the notification of abnormality. On the other hand, when the second collision signal Sb exceeds the previously stored constant value, the movable core 17 may strongly collide with the stationary core 13, and a collision sound may increase. For this reason, the ECU 1 advances the reduction start timing.

Figure 5:
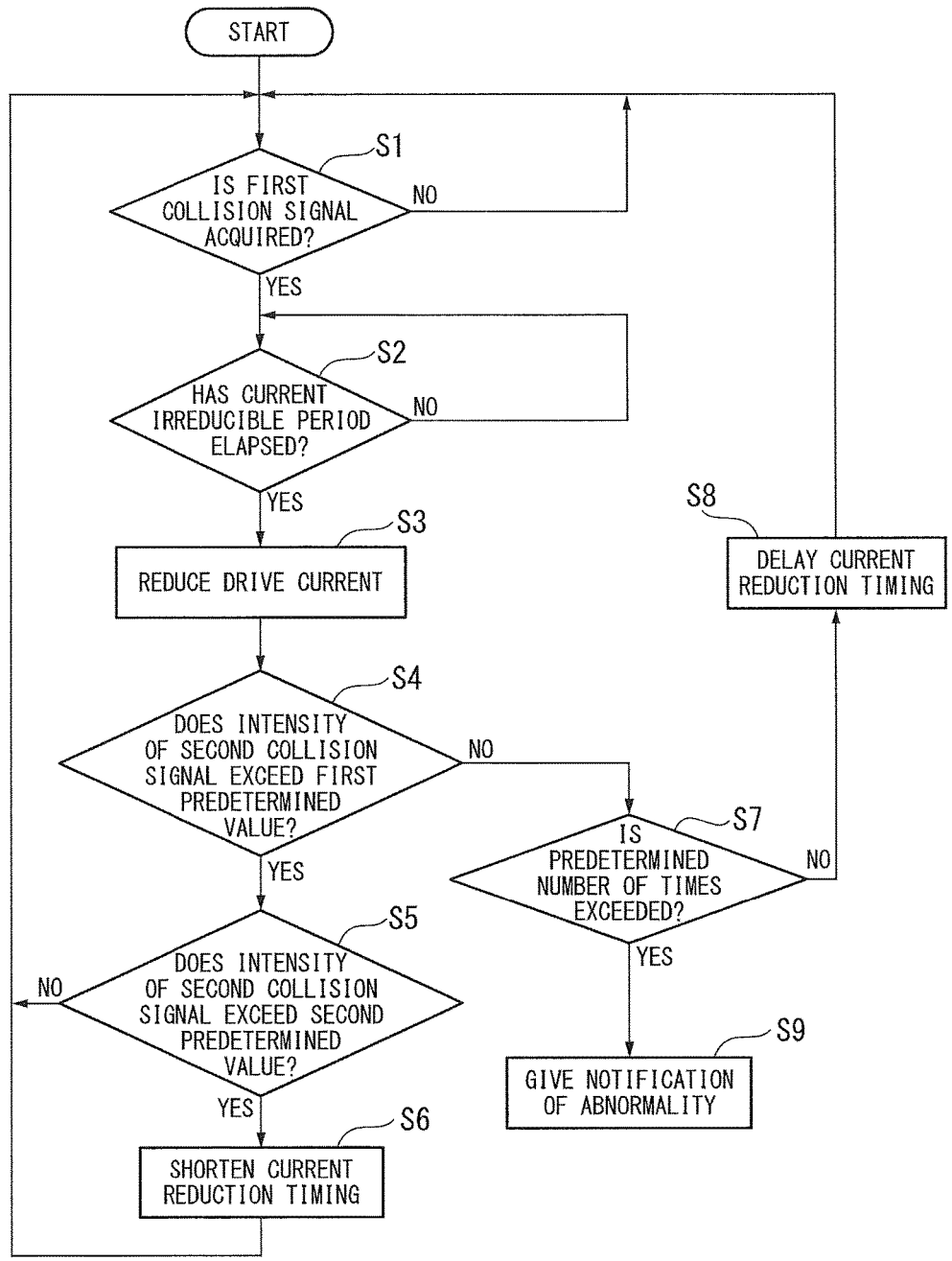
FIG. 5 is a flow chart for describing a valve opening operation of the ECU which is the embodiment of the present invention.

Next, an operation of the ECU 1 of the present embodiment at the time of the valve opening will be described with reference to a flow chart of FIG. 5.

First, the ECU 1 determines whether or not the first collision signal Sa is acquired (step S1).

Here, when the first collision signal Sa is detected from the detected signal of the in-cylinder pressure sensor 19, the ECU 1 determines that the first collision signal Sa is acquired. When the first collision signal Sa is not acquired, the ECU 1 repeats step S1.

When the first collision signal Sa is acquired, the ECU 1 determines that the current irreducible period has elapsed (step S2), and reduces the drive current supplied to the coil 14 after the elapse. Subsequently, the ECU 1 determines whether or not an intensity of the second collision signal Sb exceeds a first predetermined value that has previously been stored (step S2). The first predetermined value is a value defined to perform the determination of abnormality, and is set to be lower than a second predetermined value to be described below. In the present embodiment, when the intensity of the first collision signal Sa is too low or the first collision signal Sa repeatedly goes undetected, it is determined according to the first predetermined value that there is an abnormality as will be described below.

When the second collision signal Sb exceeds the first predetermined value, the ECU 1 determines whether or not the intensity of the second collision signal Sb exceeds a second predetermined value that has previously been stored (step S5). The second predetermined value is a value defined to determine whether or not the second collision signal Sb is too strong. Here, when the intensity of the second collision signal Sb exceeds the second predetermined value that has previously been stored, the ECU 1 advances a current reduction timing (step S6), and then returns to step S1. On the other hand, when the intensity of the second collision signal Sb does not exceed the second predetermined value that has previously been stored, the ECU 1 returns to step S1 at that point in time.

Also, when the ECU 1 determines that the second collision signal Sb does not exceed the first predetermined value in step S4, the ECU 1 determines whether an injection process in which the intensity of the second collision signal Sb does not exceed the first predetermined value that has previously been stored exceeds the fixed number of times, and if not, the ECU 1 delays the current reduction timing (step S8) and then returns to step S1. On the other hand, when the injection process in which the intensity of the second collision signal Sb does not exceed the first predetermined value that has previously been stored exceeds the fixed number of times in step S7, the ECU 1 gives the notification of abnormality (step S9).

According to this ECU 1 of the present embodiment, since a valve opening instant can be detected by the first collision signal Sa, it is possible to accurately recognize the valve opening period. Accordingly, it is possible to reduce the drive current after the ECU 1 reliably waits for the current irreducible period for which a sufficient amount of fuel is injected to elapse. Further, according to the ECU 1 of the present embodiment, the drive current is reduced before the movable core 17 collides with the stationary core 13. For this reason, the movable core 17 is decelerated by the reduction of the drive current, and the collision sound of the movable core 17 with the stationary core 13 is reduced. According to this ECU 1 of the present embodiment, the collision sound of the movable core 17 with the stationary core 13 can be further reduced in the valve opening operation of the fuel injection valve 10 while the valve element 15 is reliably opened.

Also, according to the ECU 1 of the present embodiment, the reduction start timing of the drive current is adjusted by the strength of the second collision signal Sb. For this reason, even if characteristics of the fuel injection valve 10 are changed by a time-dependent change, a change in temperature, or the like, the collision sound of the movable core 17 with the stationary core 13 can always be further reduced in the valve opening operation while the valve element 15 is reliably opened.

Also, according to the ECU 1 of the present embodiment, the reduction start timing of the drive current is advanced within a range within which the second collision signal Sb does not disappear. For this reason, the collision sound can be suppressed to be smallest while the collision of the movable core 17 with the stationary core 13 is checked.

Also, according to the ECU 1 of the present embodiment, when the second collision signal Sb is not detected after the detection of the first collision signal Sa, the reduction start timing of the drive current is delayed. For this reason, if the second collision signal Sb is detected in the next injection process, it is possible to determine that nothing is broken.

Further, when the second collision signal Sb is not detected after the detection of the first collision signal Sa, it is possible to increase the drive current up to a peak current that can be supplied to the coil 14. Thereby, since there is no possibility of the second collision signal Sb not being detected in a normal state, it is possible to more reliably determine whether or not something is broken.

While the preferred embodiment of the present invention has been described with reference to the attached drawings, it goes without saying that the present invention is not limited to the above embodiment. All the shapes and combinations of the components shown in the aforementioned embodiment are only examples and can be variously modified based on design requirements without departing from the spirit and scope of the present invention.

For example, in the above embodiment, the constitution in which the fuel injection control apparatus of the present invention is the ECU 1 has been described. However, the present invention is not limited thereto, and the fuel injection control apparatus may be installed independently of the ECU 1.

Also, in the above embodiment, the constitution in which the first collision signal Sa and the second collision signal Sb are detected from the detected result of the in-cylinder pressure sensor 19 has been described. However, the present invention is not limited thereto, and the first collision signal and the second collision signal may be detected from a detected result of another sensor.

What is claimed is:

1. A fuel injection control apparatus which controls a fuel injection valve that causes a movable core driven by an electromagnetic driving portion to collide with a valve element in a housing to thereby displace the valve element in a valve opening direction and causes the movable core to collide with a stationary core to thereby stop displacement of the movable core,
   wherein a drive current applied to the electromagnetic driving portion is reduced from a time at which a first collision signal indicating the collision of the movable core with the valve element is input at the fuel injection control apparatus to a time at which a second collision signal indicating the collision of the movable core with the stationary core is input at the fuel injection control apparatus;
   wherein the first collision signal and the second collision signal are output from an in-cylinder pressure sensor disposed in a cylinder and input at the fuel injection control apparatus.

2. The fuel injection control apparatus according to claim 1, wherein a reduction start timing of the drive current is adjusted on the basis of a strength of the input second collision signal.

3. The fuel injection control apparatus according to claim 2, wherein the reduction start timing is advanced within a range within which the second collision signal does not disappear.

4. The fuel injection control apparatus according to claim 2, wherein the reduction start timing is delayed when the second collision signal is not detected.

5. The fuel injection control apparatus according to claim 4, wherein, when the second collision signal is not detected even if the reduction start timing is delayed, the drive current is increased more than the drive current before the first collision signal is input.

6. The fuel injection control apparatus according to claim 1, wherein the drive current applied to the electromagnetic driving portion from the time at which the first collision signal is input to the time at which the second collision signal is input is reduced more than a valve opening maintaining drive current applied to the electromagnetic driving portion to maintain an open valve state.

* * * * *